United States Patent
Ouyang et al.

(10) Patent No.: US 12,424,871 B2
(45) Date of Patent: Sep. 23, 2025

(54) POWER SUPPLY SYSTEM AND POWER SUPPLY METHOD

(71) Applicant: Delta Electronics (Shanghai) Co., Ltd., Shanghai (CN)

(72) Inventors: Sanyuan Ouyang, Shanghai (CN); Hong Liu, Shanghai (CN); Weiqiang Zhang, Shanghai (CN); Baihui Song, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 18/393,578

(22) Filed: Dec. 21, 2023

(65) Prior Publication Data

US 2024/0333025 A1    Oct. 3, 2024

(30) Foreign Application Priority Data

Mar. 30, 2023    (CN) .......................... 202310331523.3

(51) Int. Cl.
*H02J 9/06*    (2006.01)
*H02J 3/06*    (2006.01)

(52) U.S. Cl.
CPC ............... *H02J 9/061* (2013.01); *H02J 3/06* (2013.01)

(58) Field of Classification Search
CPC ............... H02J 9/061; H02J 3/06; H02J 9/062
See application file for complete search history.

(56) References Cited

U.S. PATENT DOCUMENTS

2019/0245432 A1*  8/2019  Yan .................. H02M 3/33576
2022/0269325 A1*  8/2022  Huang ................. H02M 3/155

FOREIGN PATENT DOCUMENTS

| CN | 110769652 B | 9/2020 |
| CN | 114830483 A | 7/2022 |
| CN | 217010431 U | 7/2022 |

* cited by examiner

*Primary Examiner* — Lincoln D Donovan
*Assistant Examiner* — Alex W Lam
(74) *Attorney, Agent, or Firm* — CKC & Partners Co., LLC

(57) ABSTRACT

The disclosure discloses a power supply system and a power supply method. The power supply system includes a first sub-system including at least two first power supply devices and a first load, the first power supply devices for powering the first load; a second sub-system including a second power supply device and a second load, the second power supply device for powering the second load; and a connection unit configured to control electrical connection or electrical disconnection between the first power supply devices and the second load; wherein power supply availability of the first sub-system is higher than power supply availability of the second sub-system. The disclosure provides more power supply availabilities through few types of power supply structures, which facilitates application scenarios such as data center to flexibly adjust the power supply structures according to business, and save cost.

20 Claims, 14 Drawing Sheets

POWER SUPPLY SYSTEM AND POWER SUPPLY METHOD

CROSS-REFERENCE TO RELATED APPLICATIONS

This non-provisional application claims priority under 35 U.S.C. § 119(a) on Patent Application 202310331523.3 filed in P.R. China on Mar. 30, 2023, the entire contents of which are hereby incorporated by reference.

Some references, if any, which may include patents, patent applications and various publications, may be cited and discussed in the description of this application. The citation and/or discussion of such references, if any, is provided merely to clarify the description of the present application and is not an admission that any such reference is "prior art" to the application described herein. All references listed, cited and/or discussed in this specification are incorporated herein by reference in their entireties and to the same extent as if each reference was individually incorporated by reference.

BACKGROUND OF THE DISCLOSURE

1. Field of the Disclosure

The disclosure relates to the field of powering technology, and particularly to a power supply system and a power supply method.

2. Related Art

Now data center industry develops at a high speed, and as the critical infrastructure of data center, planning and design of the power supply system becomes especially important. Currently, the several common power supply structures in the power supply system, for example, include a N power supply structure (as shown in FIG. 1A), a 2N power supply structure (as shown in FIG. 1), a DR power supply structure (as shown in FIG. 1C) or a RR power supply structure (as shown in FIG. 1D), and when planning and designing, the power supply system may select according to demands.

FIG. 1A shows a typical N power supply structure applied to data center, which is the most basic power supply structure, and is the lowest requirement for powering loads, and a single-point fault on a power supply link will cause the system to stop operation. The N power supply structure may be formed of one power supply unit, and each power supply unit can satisfy the demand for electricity of all loads. For example, in FIG. 1A, a 10 kV mains supply for use as a main power supply may be introduced via a 10 kV bus, and may power an IT load through one power supply unit (each power supply unit, for example, may be formed of a transformer and an uninterruptible power supply (UPS) or a high voltage direct current (HVDC)). A diesel generator set may be used as a backup power supply.

FIG. 1B shows a typical 2N power supply structure applied to data center, which is composed of two power supply units. Each power supply unit can satisfy the demand for electricity of all loads, the two power supply units may work simultaneously and act as backup for each other, and when one power supply unit has fault and stops operation, the loads may be powered by the other power supply unit. For example, in FIG. 1B, a 10 kV mains supply 1 for use as a first main power supply and a 10 kV mains supply 2 for use as a second main power supply may be introduced via a 10 kV bus section 1 and a 10 kV bus section 2, respectively. The 10 kV mains supply 1 and the 10 kV mains supply 2 may power two IT loads through one power supply unit (each power supply unit, for example, may be formed of a transformer and an UPS or HVDC), respectively. A diesel generator set may be used as a backup power supply. When one of the two power supply units has fault and stops operation, the other of the two power supply units continues to power the IT loads.

FIG. 1C shows a typical DR power supply structure applied to data center, which is composed of a plurality of power supply units with the same configuration. The plurality of power supply units may work simultaneously and act as backup for each other, i.e., forming a "hand in hand" power supply way, and when one power supply unit has fault and stops operation, the corresponding load continues to be powered by the corresponding power supply unit. For example, in FIG. 1C, a 10 kV mains supply 1 for use as a first main power supply and a 10 kV mains supply 2 for use as a second main power supply may be introduced via a 10 kV bus section 1 and a 10 kV bus section 2, respectively, and may be correspondingly connected to three power supply units (each power supply unit, for example, may be formed of a transformer and an UPS or HVDC) through three 10 kV automatic transfer switches (ATS), respectively, and the three power supply units form a "hand in hand" power supply way to power three IT loads. A diesel generator set may be used as a backup power supply. When one of the three power supply units has fault and stops operation, the corresponding IT load may continue to be powered by the corresponding power supply unit.

FIG. 1D shows a typical RR power supply structure applied to data center, which is composed of a plurality of power supply units. One power supply unit acts as backup of other power supply units, and when one power supply unit has fault and stops operation, the backup power supply unit continues to power the loads. For example, in FIG. 1D, a 10 kV mains supply 1 for use as a first main power supply and a 10 kV mains supply 2 for use as a second main power supply may be introduced via a 10 kV bus section 1 and a 10 kV bus section 2, respectively, and may be correspondingly connected to four power supply units (each power supply unit, for example, may be formed of a transformer and an UPS or HVDC) through four 10 kV ATS, respectively, three of the four power supply units may mainly power the three IT loads through a static transfer switch (STS), respectively, and the remaining one of the four power supply units may act as a backup for backup powering the three IT loads. When one of the three power supply units has fault and stops operation, the corresponding IT load may continue to be powered by the backup power supply unit.

When selecting the power supply structure, power supply availability is a very important factor. As for the single power supply structure, the power supply availability is single. However, business of the data center has different demands for power supply availability. For example, offline calculation and offline map have a low demand for power supply availability, while some businesses, such as, bank financial and important information service have a high demand for power supply availability. The single power supply structure can only supply a single power supply availability, and does not facilitate the data center to make flexible configuration according to business, thereby saving cost. Therefore, how to provide a power supply system and a power supply method to easily supply electricity for several power supply availabilities at a low cost, such that the data center can flexibly configure the power supply structure according to business so as to reduce cost of the data center, is the technical problem to be urgently solved in the art.

The prior art often uses the following two schemes to change the power supply availability:

(1) Modularizing the power supply structure, and deploying at site according to the demand for power supply availability. But after deployment is completed, the power supply availability of the power supply structure is fixed, and if supplying other power supply availabilities, it shall be re-deployed.

(2) When building multiple power supply structures in the same power supply structure, the loads are connected to the corresponding multiple structures. But as for each power supply availability to be supplied, the system shall deploy the corresponding power supply structure, and the loads shall be correspondingly wired.

Therefore, people hope to easily supply electricity for several power supply availabilities at a low cost, such that the data center can flexibly configure the power supply structure according to business so as to reduce cost of the data center.

SUMMARY OF THE DISCLOSURE

An object of the disclosure is to provide a power supply system and a power supply method, which can effectively solve one or more deficiencies in the prior art.

In order to achieve the object, the disclosure provides a power supply system, including: a first sub-system including at least two first power supply devices and a first load, the first power supply devices for powering the first load; a second sub-system including a second power supply device and a second load, the second power supply device for powering the second load; and a connection unit configured to control electrical connection or electrical disconnection between the first power supply devices and the second load; wherein power supply availability of the first sub-system is higher than power supply availability of the second sub-system.

In order to achieve the object, the disclosure further provides a power supply method, including: powering using the power supply system.

The power supply system and the power supply method of the disclosure may supply more power supply availabilities through few types of power supply structures, which facilitates the data center to flexibly configure the power supply structures according to business, and save cost.

BRIEF DESCRIPTION OF THE DRAWINGS

Exemplary embodiments are described in details with reference to the accompanying drawings, and the above and other features and advantages of the disclosure become more apparent.

DETAILED EMBODIMENTS OF THE DISCLOSURE

Figure 1A:
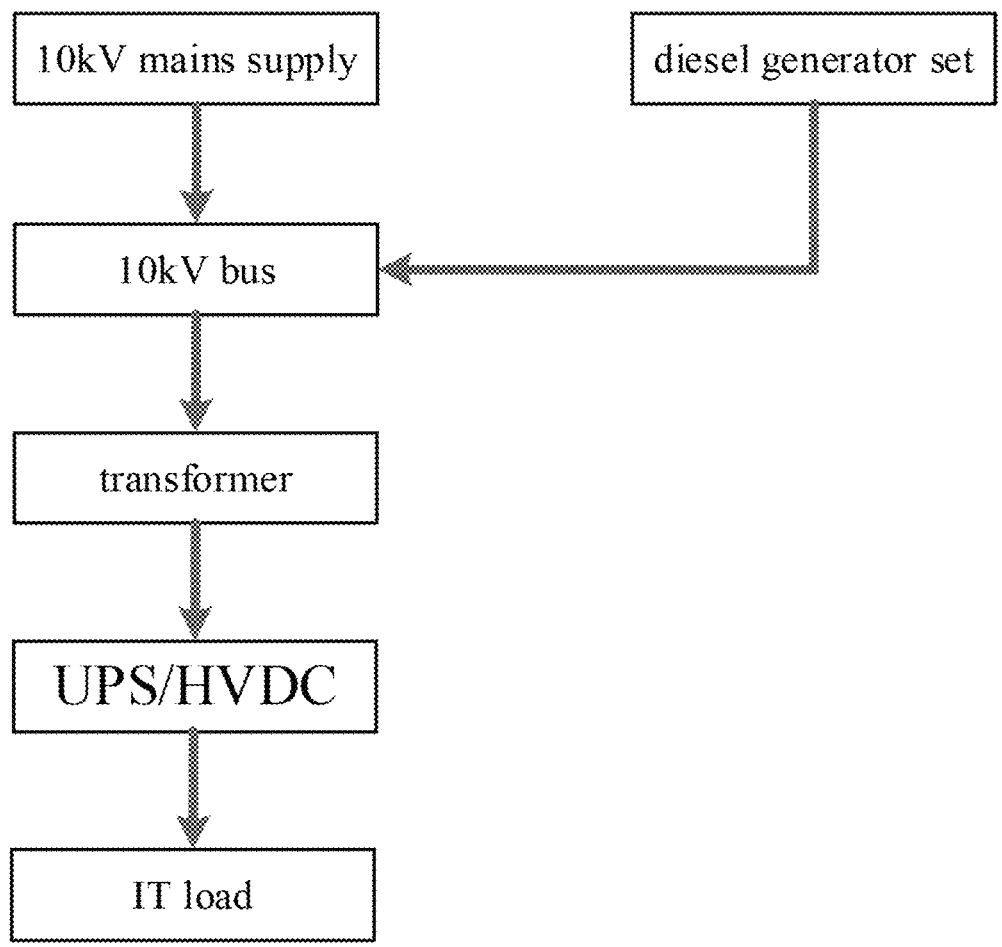
FIGS. 1A, 1B, 1C and 1D show typical N power supply structure, 2N power supply structure, DR power supply structure and RR power supply structure applied to data center, respectively.
Figure 1B:
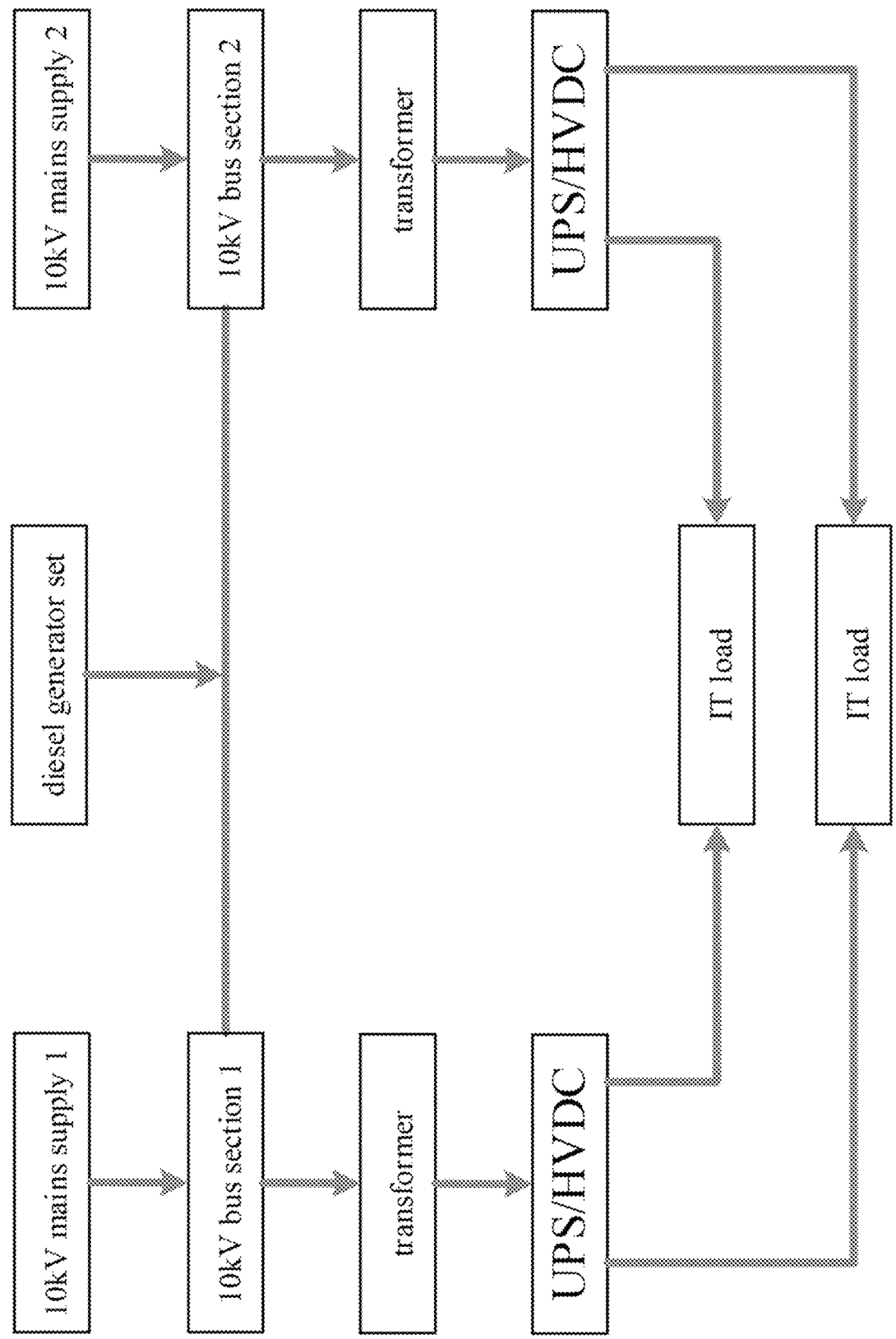

The exemplary implementations will now be described more fully with reference to the accompanying drawings. However, the exemplary implementations can be implemented in various forms and should not be understood as being limited to the implementations set forth herein; on the contrary, these implementations are provided so that this disclosure will be thorough and complete, and the conception of exemplary implementations will be fully conveyed to those skilled in the art. In the drawings, the same reference numerals denote the same or similar structure, thus their detailed description will be omitted.

When introducing the described and/or illustrated factors or components or the like, the words "one", "first", "the" and "at least one" represent one or more factors or components, or the like. The terms "comprise", "include" and "have" represent an open and including meaning, and refer to other factors or components, or the like, except listed factors, components, or the like. Moreover, when the two assemblies refer to as being "connected to" or "coupled to", both may be directly connected or coupled, and also may have an intervened assembly. The embodiments may use relative words, for example, "up" or "down" to describe a relative relation of one assembly relative to another assembly. It can be understood that if the signed device is inverted up side down, the "upper" side assembly becomes a "lower" side assembly. In addition, the terms "first", "second" and the like in the claims are only used as signs, instead of limiting the numbers of the object.

Figure 2:
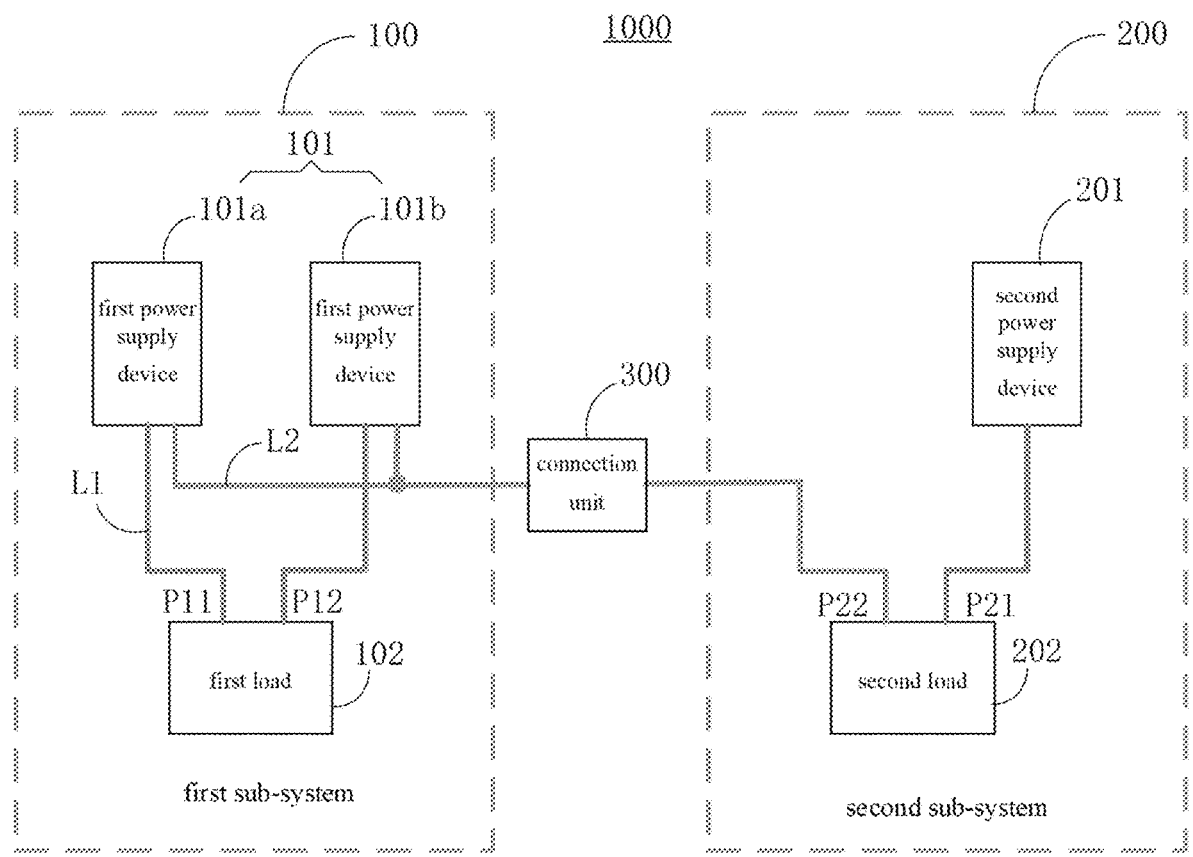
FIG. 2 is a structural diagram of a power supply system according to one embodiment of the disclosure.

As shown in FIG. 2, a power supply system 1000 of the disclosure may include a first sub-system 100, a second sub-system 200 and a connection unit 300. The first sub-system 100 may include at least two first power supply devices 101 and a first load 102, and the first power supply devices 101 may power the first load 102. The second sub-system 200 may include a second power supply device 201 and a second load 202, and the second power supply device 201 may power the second load 202. The connection unit 300 is configured to control electrical connection or electrical disconnection between the first power supply device 101 and the second load 202. Power supply availability of the first sub-system 100 is higher than power supply availability of the second sub-system 200.

In some embodiments of the disclosure, the connection unit 300 is a wire, a fuse, a switch or a converter.

Figure 4:
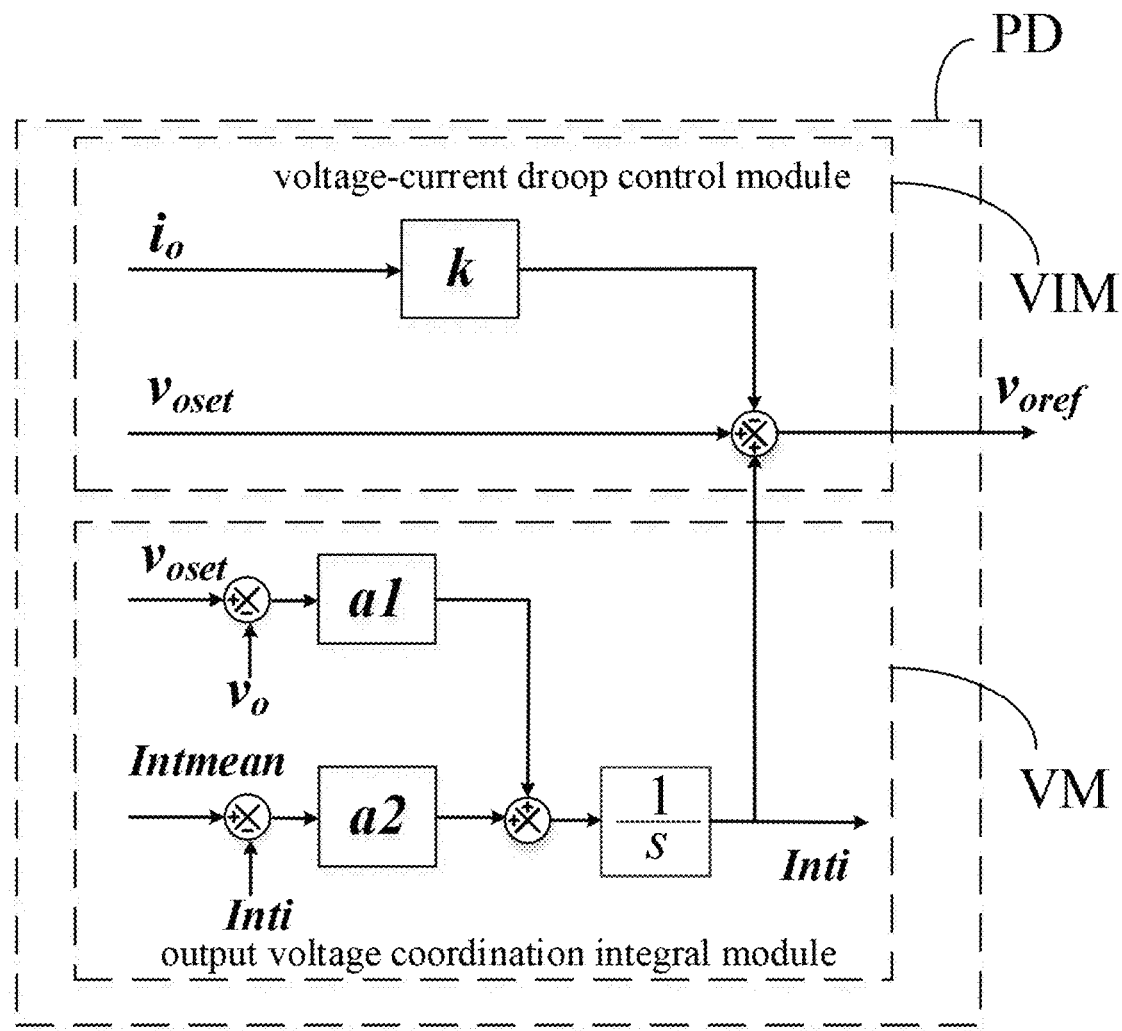
FIG. 4 is a block diagram of control of a power distribution unit in a power supply device of the power supply system according to the disclosure.

In some embodiments of the disclosure, when the connection unit 300 is electrically disconnected, the first sub-system 100 and the second sub-system 200 may be in an independent operating state, and power distribution of the first sub-system 100 and the second sub-system 200 is independently controlled. When the connection unit 300 is electrically connected, the first sub-system 100 and the second sub-system 200 may be in an interconnected operating state, and power distribution of the first sub-system 100 and the second sub-system 200 is in associated control. In actual operation, both the first power supply device 101 and the second power supply device 201 may include a power distribution unit PD (as shown in FIG. 4), when the connection unit 300 is electrically disconnected, the power distribution unit PD is configured to control power distribution inside the first sub-system 100 or the second sub-system 200, and when the connection unit 300 is electrically connected, the power distribution unit PD may be configured to control power distribution between the first sub-system 100 and the second sub-system 200. Hereinafter more specific power distribution method will be further described in details.

The power supply system of the disclosure may support various combinations of a N power supply structure, a 2N power supply structure, a DR power supply structure and a RR power supply structure. In some embodiments of the disclosure, the first sub-system 100 may be the 2N power supply structure, the DR power supply structure or the RR power supply structure, and the second sub-system 200 may be the N power supply structure, the DR power supply structure or the RR power supply structure, it should be emphasized that power supply availability of the first sub-system 100 is higher than power supply availability of the second sub-system 200.

Sometimes, the "N power supply structure" also refers to "a single system structure", the power supply structure of the second sub-system 200 in FIG. 2 is the "N power supply structure", which is composed of one power supply unit (e.g., the second power supply device 201 in FIG. 2), and each power supply unit can satisfy the demand for electricity of all loads. For example, the second sub-system 200 in FIG. 2 may power the second load 202 through the second power supply device 201.

Sometimes, the "2N power supply structure" also refers to "a double system structure", the power supply structure of the first sub-system 100 in FIG. 2 is the "2N power supply structure", which is composed of two power supply units (e.g., the first power supply devices 101a and 101b in FIG. 2), and each power supply unit can satisfy the demand for electricity of all loads. Moreover, the two power supply units may work simultaneously and act as backup for each other, and when one power supply unit has fault and stops operation, the loads may be powered by the other power supply unit. For example, the first sub-system 100 in FIG. 2 may power the first load 102 through the two first power supply devices 101a and 101b, and when the first power supply device 101a has fault and stops operation, the first load 102 may be powered by the other first power supply device 101b, or when the first power supply device 101b has fault and stops operation, the first load 102 may be powered by the other first power supply device 101a.

Figure 5:
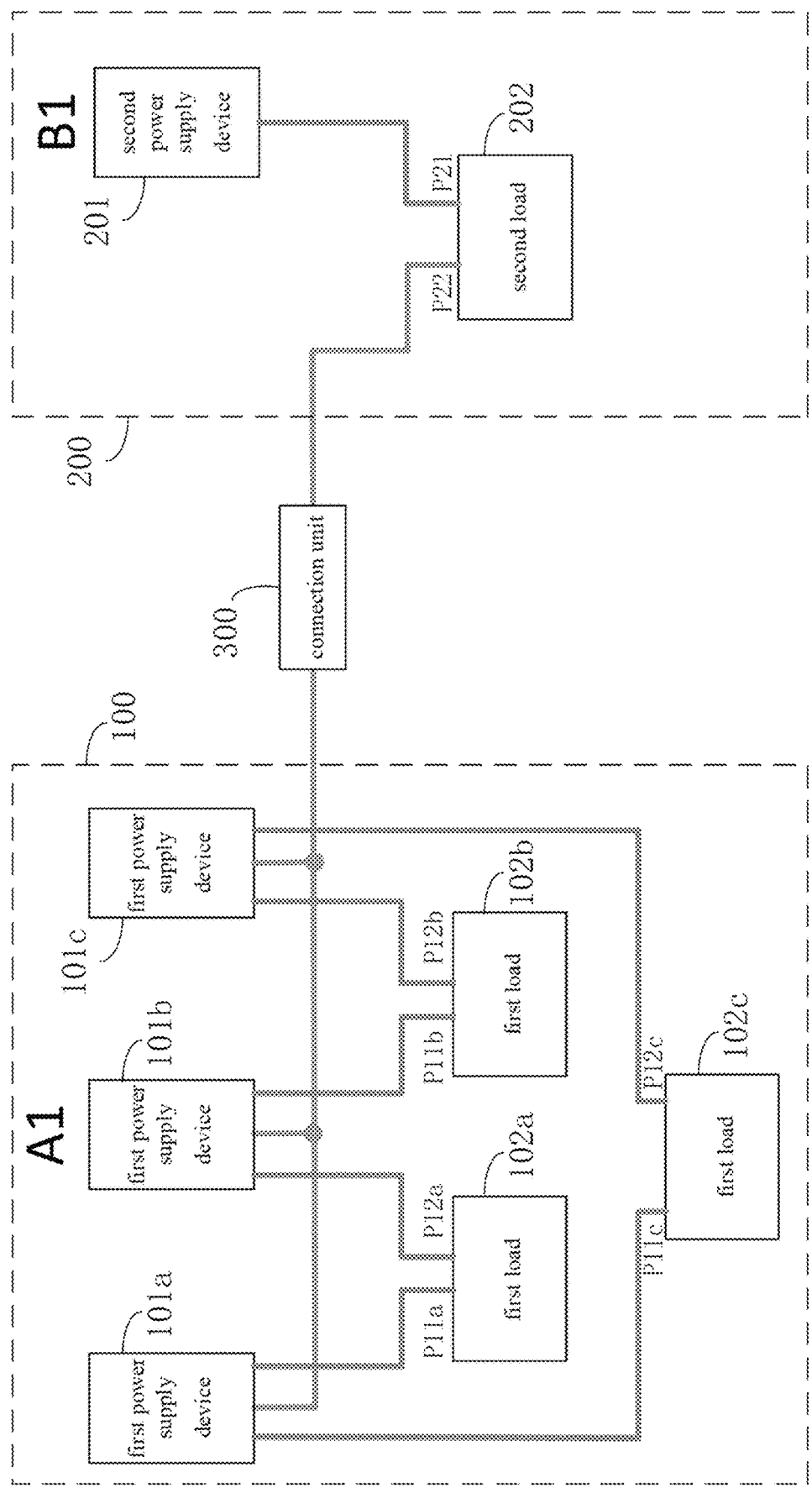
FIG. 5 is a structural diagram of the power supply topology combination of the power supply system according to one embodiment of the disclosure, wherein the power supply system is composed of the DR power supply structure and the N power supply structure.

Sometimes, the "DR power supply structure" also refers to "a distributed redundant power supply structure", and the power supply structure of the first sub-system 100 in FIG. 5 is the "DR power supply structure", which is composed of a plurality of power supply units with the same configuration. The plurality of power supply units may work simultaneously and act as backup for each other, i.e., forming a "hand in hand" power supply way, and when one power supply unit has fault and stops operation, the corresponding load continues to be powered by the corresponding power supply unit. For example, the first sub-system 100 in FIG. 5 may power the first loads 102a, 102b and 102c through the three first power supply devices 101a, 101b and 101c, and for example, when the first power supply device 101a has fault and stops operation, the first load 102a may be powered by the corresponding first power supply device 101b. The power supply ways when other first power supply devices 101b and 101c have fault and stop operation are similar.

Sometimes, the "RR power supply structure" also refers to "a backup redundant power supply structure", which is composed of a plurality of power supply units, one power supply unit acts as a backup of other power supply units, and when one power supply unit has fault and stops operation, the load continues to be powered by the backup power supply unit.

Figure 1C:
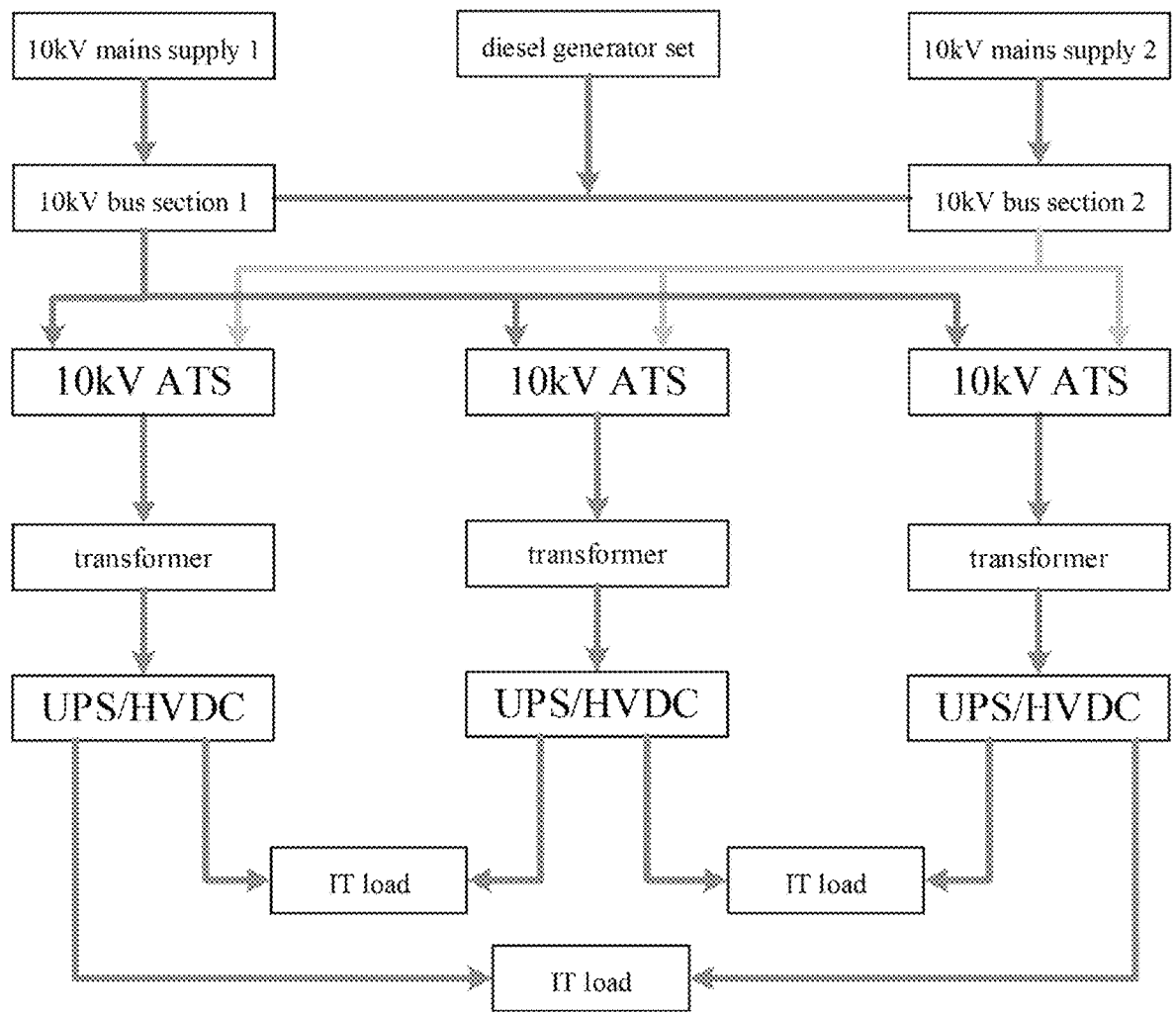
Figure 1D:
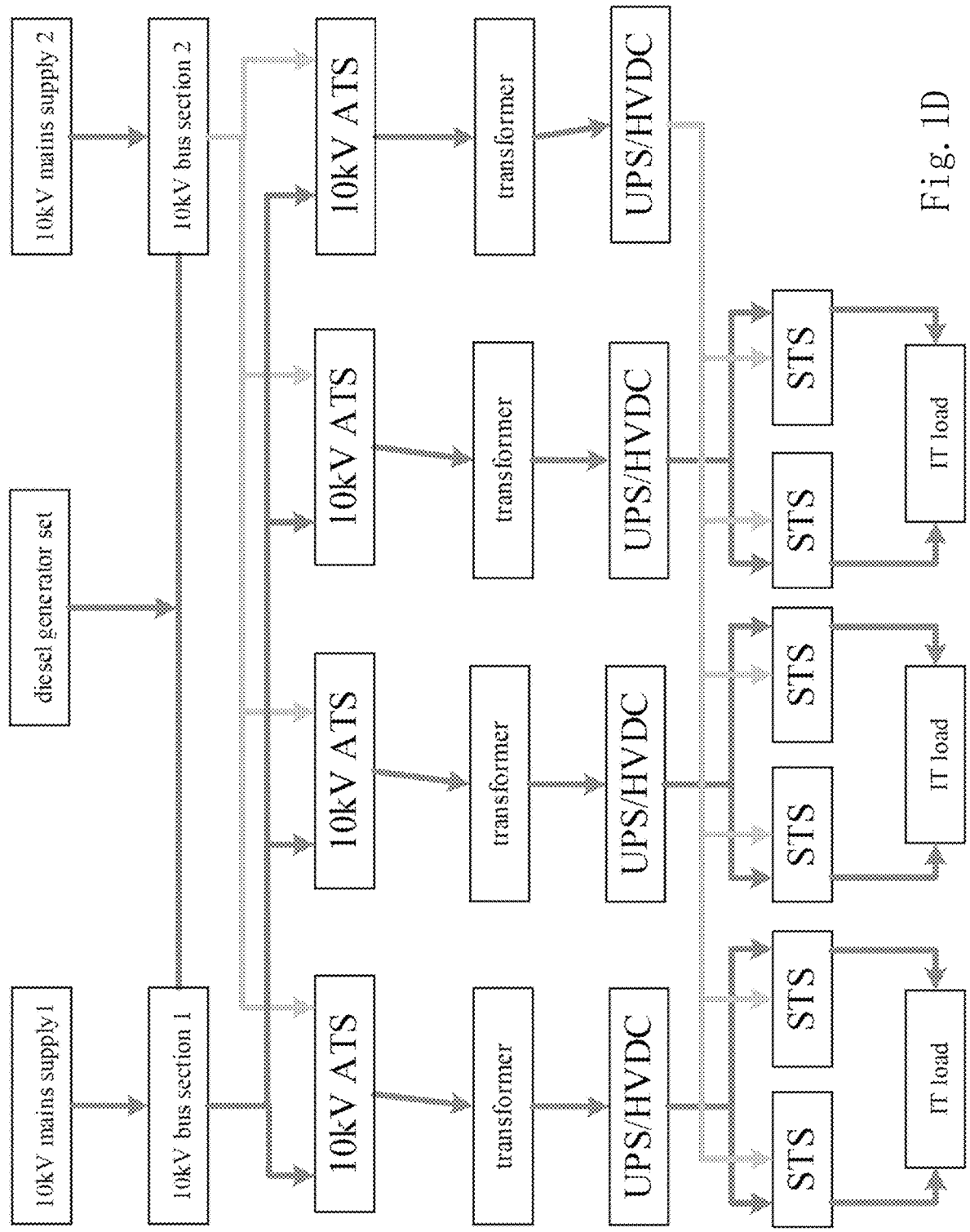

In the disclosure, the N power supply structure has a low power supply availability, and the 2N power supply structure, the DR power supply structure and the RR power supply structure have a high power supply availability. As is seen from the power supply availabilities, the power supply availability of the 2N power supply structure>the power supply availability of the DR power supply structure (taking a structure with three power supply devices for example, more specific structure may refer to FIG. 1C)>the power supply availability of the RR power supply structure (taking a structure with four power supply devices for example, more specific structure may refer to FIG. 1D)>the power supply availability of the N power supply structure. Taking UPTIME Tier rating for example, the N power supply structure, for example, may correspond to Tier I, the DR power supply structure and the RR power supply structure, for example, may correspond to Tier III, and the 2N power supply structure, for example, may correspond to Tier IV. Therefore, in the disclosure, when the second sub-system 200 is the N power supply structure, the first sub-system 100 may be the 2N power supply structure, the DR power supply structure or the RR power supply structure with a higher power supply availability, when the second sub-system 200 is the RR power supply structure, the first sub-system 100 may be the 2N power supply structure or the DR power supply structure with a higher power supply availability, and when the second sub-system 200 is the DR power supply structure, the first sub-system 100 may be the 2N power supply structure with a higher power supply availability.

Figure 3:
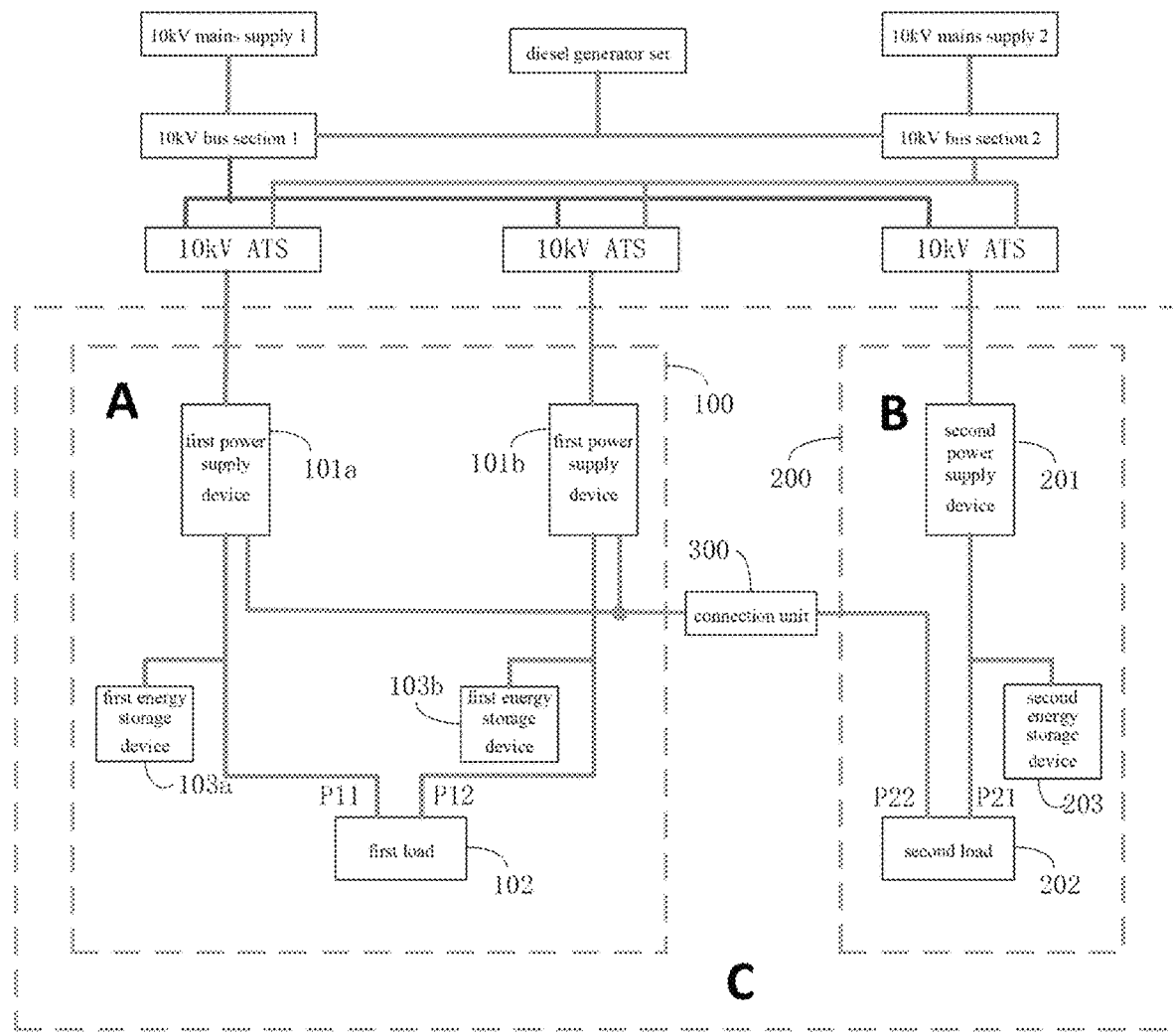
FIG. 3 is a structural diagram of the power supply system of FIG. 1 applied to data center for powering.

FIG. 3 is a structural diagram of the power supply system 1000 of FIG. 2 applied to data center for powering. The data center power supply system shown in FIG. 3 is powered by a dual power supply, for example, may be configured with a 10 kV mains supply 1 and a 10 kV mains supply 2 for use as a main power supply, and a diesel generator set for use as a backup power supply, and connected to a plurality of 10 kV automatic transfer switches (ATS) through a 10 kV bus section 1 and a 10 kV bus section 2. The ATS are connected to power distribution units (i.e., the first power supply devices 101a, 101b and the second power supply device 201) in the power supply system 1000 of FIG. 2, and each power distribution unit is, for example, a solid state transformer (SST).

The power supply system 1000 shown in FIG. 2 include the first sub-system 100 having a high power supply availability and the second sub-system 200 having a low power supply availability. The first sub-system 100, for example, may be the 2N power supply structure, includes two first power supply devices 101, i.e., the first power supply devices 101a and 101b, and powers a first port P11 and a second port P12 of the first load 102, respectively. The second sub-system 200, for example, may be the N power supply structure, includes one second power supply device 201, and powers a first port P21 of the second load 202. Each of the first power supply devices 101 (including 101a and 101b) may power a second port P22 of the second load 202 through the connection unit 300. In some embodiments of the disclosure, the first power supply devices 101, for example, may include a first bus L1 and a second bus L2 independent from each other. The first power supply devices 101, for example, may power the first port P11 and the second port P12 of the first load 102 through the first bus L1, and power the second port P22 of the second load 202 through the second bus L2 and the connection unit 300. The second power supply device 201, for example, may also power the first port P21 of the second load 202 through the independent bus.

In some embodiments of the disclosure, as shown in FIG. 3, the first sub-system 100 may further include first energy storage devices, such as, first energy storage device 103a and 103b in FIG. 3 electrically connected to the first power supply devices 101a and 101b in one-to-one correspondence, i.e., the first energy storage device 103a electrically connected to the first power supply devices 101a, and the first energy storage device 103b electrically connected to the first power supply devices 101b. The second sub-system 200 may further include a second energy storage device, such as, a second energy storage device 203 in FIG. 3, electrically connected to the second power supply device 201. It can be understood that the number of the energy storage devices in the sub-systems is the same as the number of the power supply devices, and the energy storage devices are electrically connected to the corresponding power supply devices in one-to-one correspondence. These energy storage devices may be used as backup power supplies when the mains supply has fault.

In the embodiment of FIG. 3, a first power supply availability corresponding to the N power supply structure and a second power supply availability corresponding to the 2N power supply structure may be supplied respectively through electrical disconnection of the connection unit 300, and a third power supply availability corresponding to the DR power supply structure may be supplied through electrical connection of the connection unit 300. The third power supply availability is higher than the first power supply availability and lower than the second power supply availability.

More specifically, when the connection unit 300 is electrically disconnected, the first sub-system 100 and the second sub-system 200 may power, respectively, and power distribution of the first sub-system 100 and the second sub-system 200 is independently controlled. At this time, the first sub-system 100 may supply a power supply structure A (such as, corresponding to the 2N power supply structure) having the first power supply availability, and the second sub-system 200 may supply a power supply structure B (such as, corresponding to the N power supply structure) having the second power supply availability. When the connection unit 300 is electrically connected, power distribution of the first sub-system 100 and the second sub-system 200 is in associated control, and redundant power of the first sub-system 100 may be supplied to the second sub-system 200 for use. At this time, the power supply system may supply a power supply structure C (such as, corresponding to the DR power supply structure) having the third power supply availability, i.e., an utilization ratio and the power supply availability of the power supply structure C consisting of the first sub-system 100 and the second sub-system 200 are consistent with that of the DR power supply structure, and may be equivalent to the DR power supply structure.

In some embodiments of the disclosure, as shown in FIG. 4, the power distribution unit PD in the power supply device of the power supply system of the disclosure may include a voltage-current droop control module VIM for regulating power, and satisfying:

$$v_{oref} = v_{oset} - k * i_o,$$

where $v_{oset}$ is a set value of an output voltage, $v_{oref}$ is a reference voltage of a voltage and current loop, $i_o$ is an output current, and k is a current divider coefficient.

In some other embodiments of the disclosure, the power distribution unit PD may further include an output voltage coordination integral module for eliminating a static error of the output voltage $v_o$, $$\frac{1}{S}$$

in FIG. 4 represents an integration element, so it satisfies:

$$Inti = \int [a1 * (v_{oset} - v_o) + a2 * (Intmean - Inti)],$$

where Inti is an integral value of the corresponding power supply devices, Intmean is an integral mean of the power supply devices of the power supply system, a1 and a2 are regulation coefficients, and it satisfies:

$$v_{oref} = v_{oset} - k * i_o + Inti.$$

Hereinafter taking the data center power supply system shown in FIG. 3 for example, referring to FIGS. 1 and 3, a power distribution method of the power supply system having several available rates of the disclosure is explained in details. The power distribution method of the disclosure may include the following steps:

Step 1, the power supply devices (such as, SST) of the power supply system include the power distribution unit PD shown in FIG. 4, and may support power distribution in and between the power supply structures. Control of the power distribution unit PD uses V-I droop control to regulate power and eliminate a static difference of an output voltage $v_o$ through coordination integral, and satisfies:

$$v_{oref} = v_{oset} - k * i_o + Inti;$$

where $v_{oset}$ is aset value of the output voltage, $v_{oref}$ is a reference voltage of a voltage and current loop, $i_o$ is an output current, k is a current divider coefficient, and Inti is an integral value of the corresponding power supply devices.

wherein, $$Inti = \int [a1 * (v_{oset} - v_o) + a2 * (Intmean - Inti)];$$

where Intmean is an integral mean of the power supply devices of the power supply system, and a1 and a2 are regulation coefficients.

Step 2, adjusting power distribution of the power supply devices according to a state of the power supply system.

More specifically, when making power distribution, as for the data center power supply system shown in FIG. 3, when the connection unit 300 is electrically disconnected, the power supply structure A and the power supply structure B are independently operated, and the two first power supply devices 101a and 101b in the power supply structure A may distribute power by 1:1 in the power supply structure. When the connection unit 300 is electrically connected, the power supply structure A and the power supply structure B are in interconnected operation, the two first power supply devices 101a and 101b in the power supply structure A and the second power supply device 201 in the power supply structure B may distribute power between the power supply structures by 3:3:2.

When the power supply structure A and the power supply structure B are in interconnected operation, and has the situation where the power supply device has fault and stops operation, power distribution may be made using the following method:

(1) when one of the two first power supply devices 101a and 101b (such as, 101a) of the power supply structure A has fault and stops operation, the connection unit 300 may be closed or not closed. If the connection unit is not closed, i.e., the connection unit 300 is configured to be electrically connected, the other of the two first power supply devices 101a and 101b (such as, 101b) of the power supply structure A and the second power supply device 201 of the power supply structure B distribute power between the power supply structures by 1:1.

(2) when one of the two first power supply devices 101a and 101b (such as, 101b) of the power supply structure A has fault and stops operation, the connection unit 300 may be closed or not closed. If the connection unit is not closed, i.e., the connection unit 300 is configured to be electrically connected, the other of the two first power supply devices 101a and 101b (such as, 101a) of the power supply structure A and the second power supply device 201 of the power supply structure B distribute power between the power supply structures by 1:1.

(3) when the second power supply device 201 of the power supply structure B has fault and stops operation, the two first power supply devices 101a and 101b of the power supply structure A may evenly distribute power inside the power supply structure by 1:1.

When one first power supply device (such as, 101a) of the power supply structure A and the second power supply device 201 of the power supply structure B have fault and stop operation, the connection unit 300 may be configured to be electrically disconnected, and the first load 102 may be powered by the other first power supply device (such as, 101b), such that it still can be ensured that powering of the load of the power supply structure A is not affected.

Taking the data center power supply system composed of the 2N power supply structure and the N power supply structure shown in FIG. 3 for example, implementation effect of the power supply system of the disclosure is as follows: as for the power supply system shown in FIG. 3, the power supply structure A having a high power supply availability may be powered using the 2N power supply structure, the power supply structure B having a low power supply availability may be powered using the N power supply structure, and both may be interconnected through the connection unit 300. When the connection unit 300 is electrically disconnected, the power supply structure A and the power supply structure B are powered, respectively, and power distribution of the power supply structure A and the power supply structure B is independently controlled; when the connection unit 300 is electrically connected, power distribution of the power supply structure A and the power supply structure B are in associated control, and redundant power of the power supply structure A may be supplied to the power supply structure B for use. Advantage of the power supply system shown in FIG. 3 is to provide effect of the corresponding power supply availability of the three power supply structures such as the N power supply structure, the 2N power supply structure and the DR power supply structure through the way of a combination of the N power supply structure and the 2N power supply structure, which facilitates the data center to flexibly adjust the power supply structures according to business, and save cost.

It can be understood that the first load and the second load of the exemplary data center power supply system shown in FIG. 3 have equal power, and power distribution may be made using the above method. If the first load and the second load are different loads, power distribution may have various different configurations, and capacity of the power supply devices may also vary, so the power distribution method of the power supply system of the disclosure is not limited thereto.

As shown in FIG. 5, it shows a structure of the power supply topology combination of the power supply system according to one embodiment of the disclosure. In the embodiment of FIG. 5, the power supply system of the disclosure, for example, may be composed of the DR power supply structure and the N power supply structure. When the connection unit 300 is electrically disconnected, the first sub-system 100 and the second sub-system 200 may power, respectively, and power distribution of the first sub-system 100 and the second sub-system 200 is independently controlled. At this time, the first sub-system 100 may supply a power supply structure A1 (such as, corresponding to the DR power supply structure) having the first power supply availability, and the second sub-system 200 may supply a power supply structure B1 (such as, corresponding to the N power supply structure) having the second power supply availability.

In the embodiment of FIG. 5, the first sub-system 100, for example, includes three first power supply devices 101a, 101b and 101c and three first loads 102a, 102b and 102c, the first power supply device 101a powers the first loads 102a and 102c, the first power supply device 101b powers the first loads 102a and 102b, and the first power supply device 101c powers the first loads 102b and 102c. When the connection unit 300 is electrically disconnected, the three first power supply devices 101a, 101b and 101c may work simultaneously and act as backup for each other, i.e., forming a "hand in hand" power supply way (for example, the first power supply devices 101a and 101b power a first port P11a and a second port P12a of the first load 102a, respectively, the first power supply devices 101b and 101c power a first port P11b and a second port P12b of the first load 102b, respectively, and the first power supply devices 101a and 101c power a first port P11c and a second port P12c of the first load 102c, respectively). Moreover, when one of the first power supply devices has fault and stops operation, the corresponding load may continue to be powered by the corresponding first power supply device. For example, when the first power supply device 101a has fault and stops operation, the first load 102a may be powered by the corresponding first power supply device 101b.

In the embodiment of FIG. 5, the second sub-system 200 includes one second power supply device 201, and may power the second load 202 through a first port P21. The three first power supply devices 101a, 101b and 101c may be further connected to a second port P22 of the second load 202 through the connection unit 300, thereby powering the second load 202 when the connection unit 300 is electrically connected.

Figure 6:
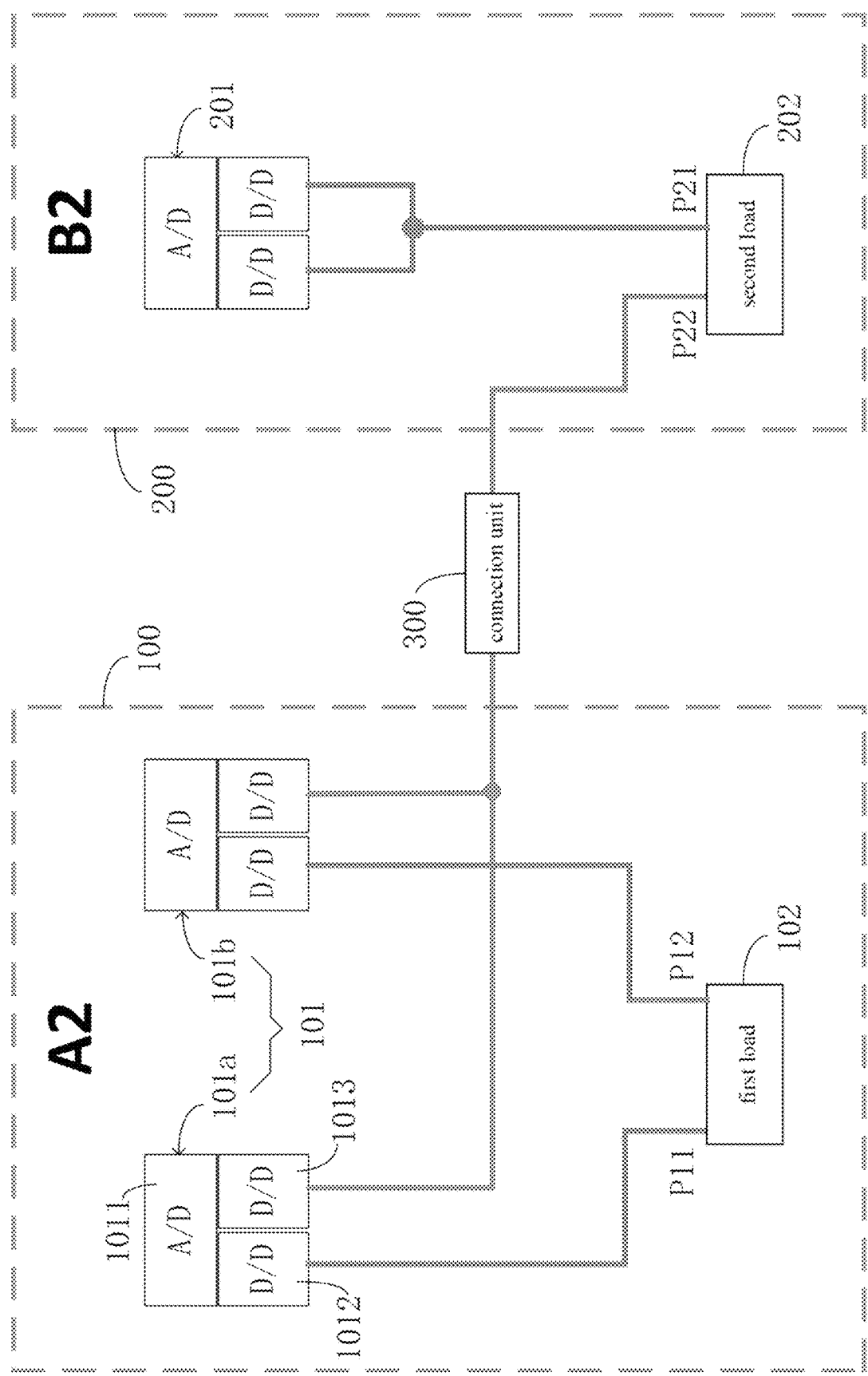
FIG. 6 is a structural diagram of the power supply topology combination of the power supply system according to one embodiment of the disclosure, wherein the power supply system is composed of the 2N power supply structure and the N power supply structure, and each power supply device of the power supply system includes an AC-DC converter and two DC-DC converters connected thereto.

As shown in FIG. 6, it shows a structure of the power supply topology combination of the power supply system according to one embodiment of the disclosure. In the embodiment of FIG. 6, the power supply system of the disclosure, for example, may be composed of the 2N power supply structure and the N power supply structure. When the connection unit 300 is electrically disconnected, the first sub-system 100 and the second sub-system 200 may power, respectively, and power distribution of the first sub-system 100 and the second sub-system 200 is independently controlled. At this time, the first sub-system 100 may supply a power supply structure A2 (such as, corresponding to the 2N power supply structure) having the first power supply availability, and the second sub-system 200 may supply a power supply structure B2 (such as, corresponding to the N power supply structure) having the second power supply availability.

In the embodiment of FIG. 6, the first sub-system 100, for example, includes two first power supply devices 101a and 101b, and the two first power supply devices 101a and 101b may power one first load 102. For example, the first power supply devices 101a and 101b may power the first load 102 through the first port P11 and the second port P12, respectively. When the connection unit 300 is electrically disconnected, the two first power supply devices 101a and 101b may work simultaneously and act as backup for each other, and for example, when the first power supply device 101a has fault and stops operation, the first load 102 may continue to be powered by the first power supply device 101b.

In the embodiment of FIG. 6, the second sub-system 200, for example, includes one second power supply device 201, and may power the second load 202 through the first port P21. The two first power supply devices 101a and 101b may be further connected to the second port P22 of the second load 202 through the connection unit 300, thereby powering the second load 202 when the connection unit 300 is electrically connected.

In the embodiment of FIG. 6, each power supply device (such as, including the first power supply device 101 in the first sub-system 100 and the second power supply device 201 in the second sub-system 200) of the power supply system is "an one for two structure", and taking the first power supply device 101a in the first sub-system 100 for example, it may include one AC-DC converter (A/D) 1011 and two DC-DC converters (D/D) 1012 and 1013 connected thereto. The first power supply devices 101a and 101b, for example, may be coupled to the first port P11 and the second port P12 of the first load 102 through the DC-DC converter (D/D) 1012, respectively, thereby powering the first load 102. The DC-DC converter (D/D) 1013 of the first power supply devices 101a and 101b may be coupled to the second port P22 of the second load 202 through the connection unit 300, thereby powering the second load 202 when the connection unit 300 is electrically connected.

In some embodiments of the disclosure, the number of the first sub-system 100 may be one, the number of the second sub-system 200 is equal to that of the connection unit 300 and is at least two, and each of the second sub-systems 200 may be electrically connected to the first sub-system 100 through the corresponding connection unit 300.

Figure 7:
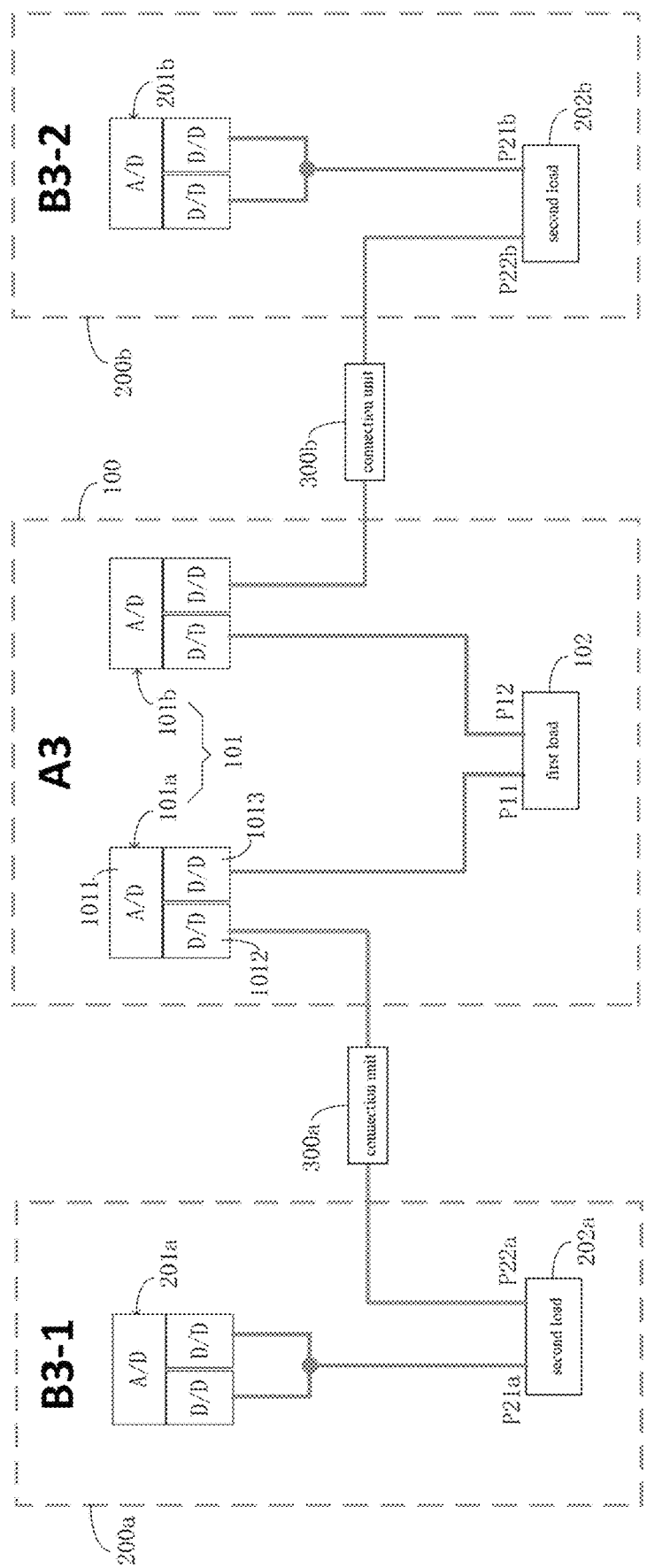
FIG. 7 is a structural diagram of the power supply topology combination of the power supply system according to one embodiment of the disclosure, wherein the power supply system is composed of interconnection of power supply structures with a plurality of power supply availabilities, and each power supply device of the power supply system includes an AC-DC converter and two DC-DC converters connected thereto.

As shown in FIG. 7, it shows a structure of the power supply topology combination of the power supply system according to one embodiment of the disclosure. In the embodiment of FIG. 7, the power supply system of the disclosure may be composed of interconnection of power supply structures with three power supply availabilities, and the two second sub-systems 200a and 200b are electrically connected to the first sub-system 100 through the connection units 300a and 300b, respectively. When the connection units 300a and 300b are electrically disconnected, the first sub-system 100 and the two second sub-systems 200a and 200b may power, respectively, and power distribution of the first sub-system 100 and the two second sub-systems 200a and 200b is independently controlled. At this time, the first sub-system 100 may supply a power supply structure A3 (such as, corresponding to the 2N power supply structure) having the first power supply availability, and the two second sub-systems 200a and 200b may supply power supply structures B3-1 and B3-2 (such as, corresponding to the N power supply structure) having the second power supply availability, respectively.

In the embodiment of FIG. 7, each power supply device (such as, including the first power supply device 101 in the first sub-system 100 and the second power supply device 201a/201b in the second sub-system 200a/200b) of the power supply system is "an one for two structure", and taking the first power supply device 101a in the first sub-system 100 for example, it may include one AC-DC converter (A/D) 1011 and two DC-DC converters (D/D) 1012 and 1013 connected thereto.

In the embodiment of FIG. 7, the first sub-system 100 includes two first power supply devices 101a and 101b, and the two first power supply devices 101a and 101b may power one first load 102. For example, the first power supply devices 101a and 101b, for example, may be coupled to the first port P11 and the second port P12 of the first load 102 through one DC-DC converter (D/D), respectively, thereby powering the first load 102. When the connection units 300a and 300b are electrically disconnected, the two first power supply devices 101a and 101b may work simultaneously and act as backup for each other. For example, when the first power supply device 101a has fault and stops operation, the first load 102 may continue to be powered by the first power supply device 101b.

In the embodiment of FIG. 7, each of the second subsystem 200a/200b includes one second power supply device 201a/201b, and the two DC-DC converters (D/D) of each of the second power supply device 201a/201b are commonly coupled to the first port P21a/P21b of the second load 202a/202b, thereby powering the corresponding second load 202a/202b through the corresponding first port P21a/P21b. The two first power supply devices 101a and 101b may be further connected to the corresponding second ports P22a and P22b of the corresponding second loads 202a and 202b through the connection units 300a and 300b, respectively, thereby powering the corresponding second loads 202a and 202b when the connection units 300a and 300b are electrically connected.

Figure 8:
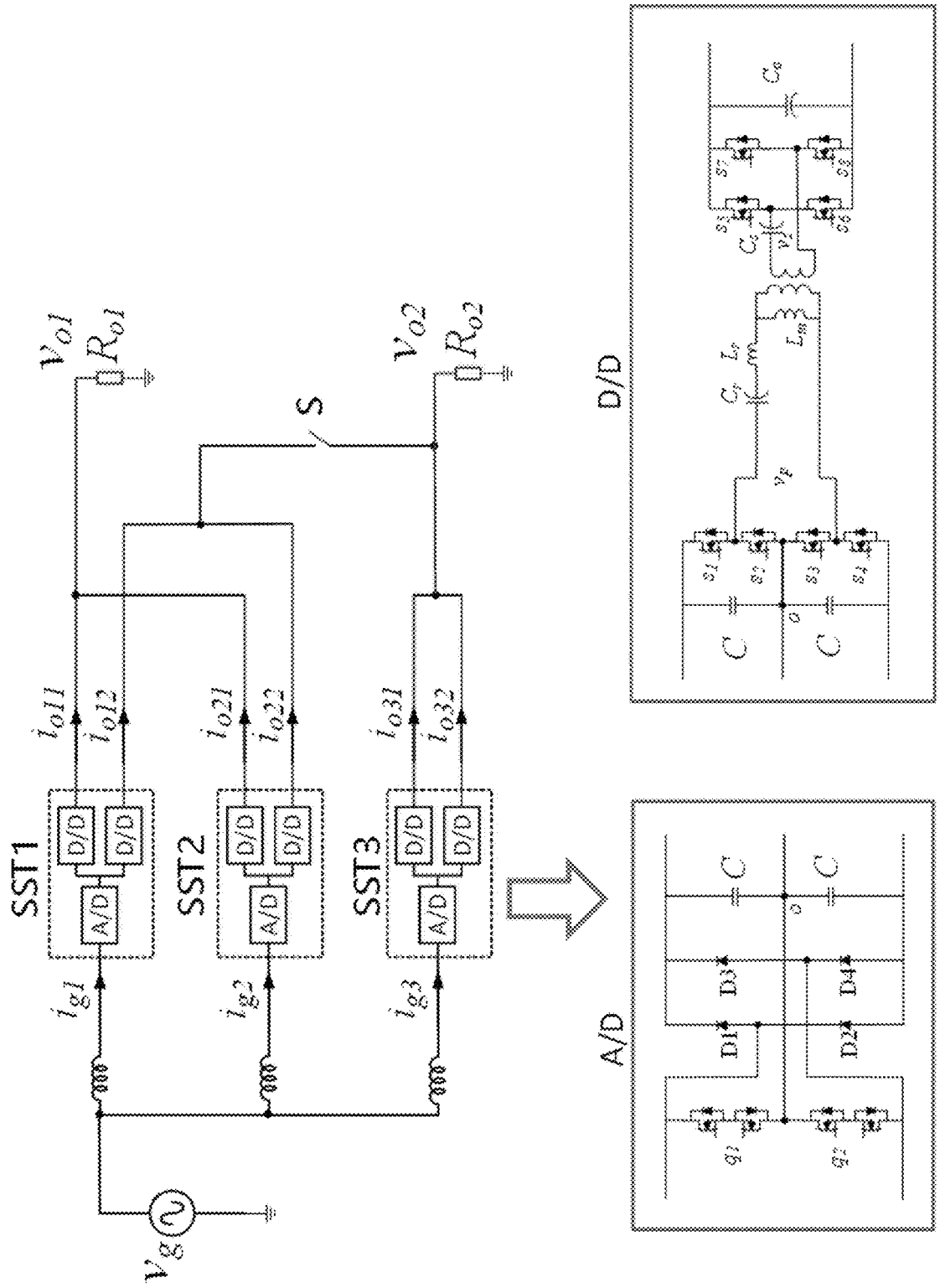
FIG. 8 is an exemplary circuit of the power supply system according to the disclosure, wherein each power supply device of the power supply system is, for example, a solid state transformer (SST), and each SST uses a single module with an one for two structure.

As shown in FIG. 8, it shows an exemplary circuit of the power supply system according to the disclosure. The power supply system, for example, includes three power supply devices, each power supply device may be a solid state transformer (SST), and each power supply device may use a single module with "an one for two structure". That is, the power supply system includes SST1 to SST3, and each of the SST1 to SST3 includes one AC-DC converter (A/D) at a preceding stage and two DC-DC converters (D/D) connected thereto at a post stage. The AC-DC converter (A/D) may use a three-level HPFC circuit (a left side circuit below in FIG. 8), and the DC-DC converters (D/D) may use LLC converters (a right side circuit below in FIG. 8). The A/D at the preceding stage may be controlled using a double closed-loop, and the D/D at the post stage may be controlled using a double closed-loop and use a power distribution unit.

In the embodiment of FIG. 8, the SST1 to SST3 have input sides electrically connected to an AC power supply $v_g$, and have input currents $i_{g1}$, $i_{g2}$ and $i_{g3}$, respectively.

When a switch S is electrically disconnected, power distribution of the SST1 to SST3 is independently controlled. The SST1 and the SST2 may form, for example, the power supply structure A (such as, corresponding to the 2N power supply structure) having the first power supply availability in FIG. 3, the SST3 may form, for example, the power supply structure B (such as, corresponding to the N power supply structure) having the second power supply availability in FIG. 3, and the power supply structure A and the power supply structure B may power a load $R_{o1}$ and a load $R_{o2}$, respectively. For example, an output side of one DC-DC converter (D/D) in the SST1 and SST2 may output corresponding output currents $i_{o11}$ and $i_{o21}$, respectively, and power the load $R_{o1}$, and an output voltage, for example, is $v_{o1}$. Output sides of the two DC-DC converters (D/D) in the SST3 may output corresponding output currents $i_{o31}$ and $i_{o32}$, respectively, and power the load $R_{o2}$, and an output voltage is $v_{o2}$.

When the switch S is electrically connected, power distribution of the SST1 to SST3 is in associated control, redundant power of the SST1 and SST2 may be supplied to the SST3 for use, and the power supply system may supply the power supply structure C (such as, corresponding to the DR power supply structure) having the third power supply availability.

Figure 9:
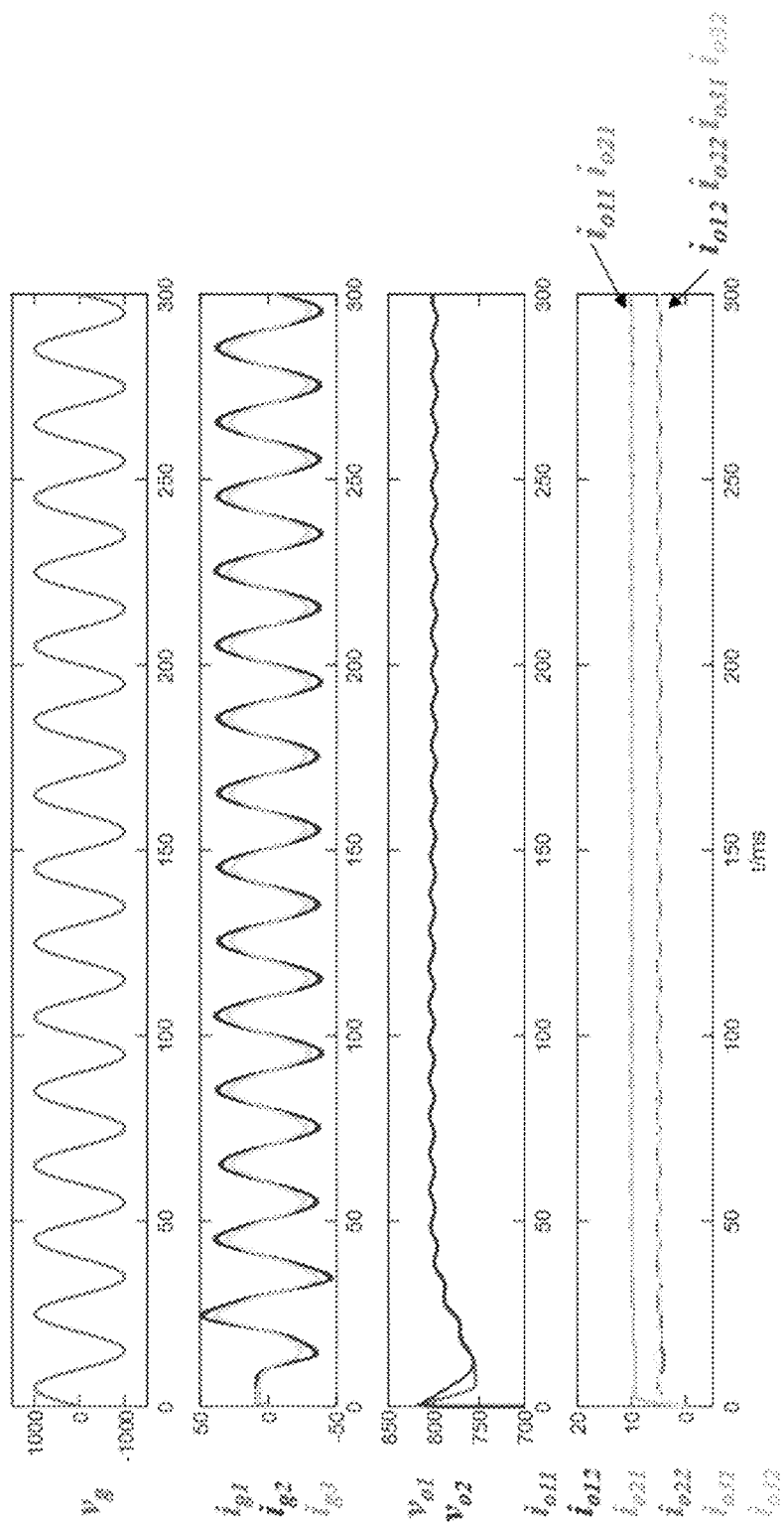
FIG. 9 is a schematic diagram of effect when the power supply system of FIG. 8 is normally operated.

FIG. 9 is a schematic diagram of effect when the power supply system of FIG. 8 is normally operated, and shows the effect when the system is normally operated. In this example, the loads $R_{o1}$ and $R_{o2}$ have the same power, and power distribution ratio of the SST1 to SST3 is equal to 3:3:2. As can be seen from FIG. 9, when the power supply structure A and the power supply structure B are normally operated, the system can be stably operated using the power distribution method of the disclosure. Of course, the disclosure is not limited thereto, and the power distribution ratio of the SSTs may be flexibly allocated according to change of the loads and the SST structure.

Figure 10:
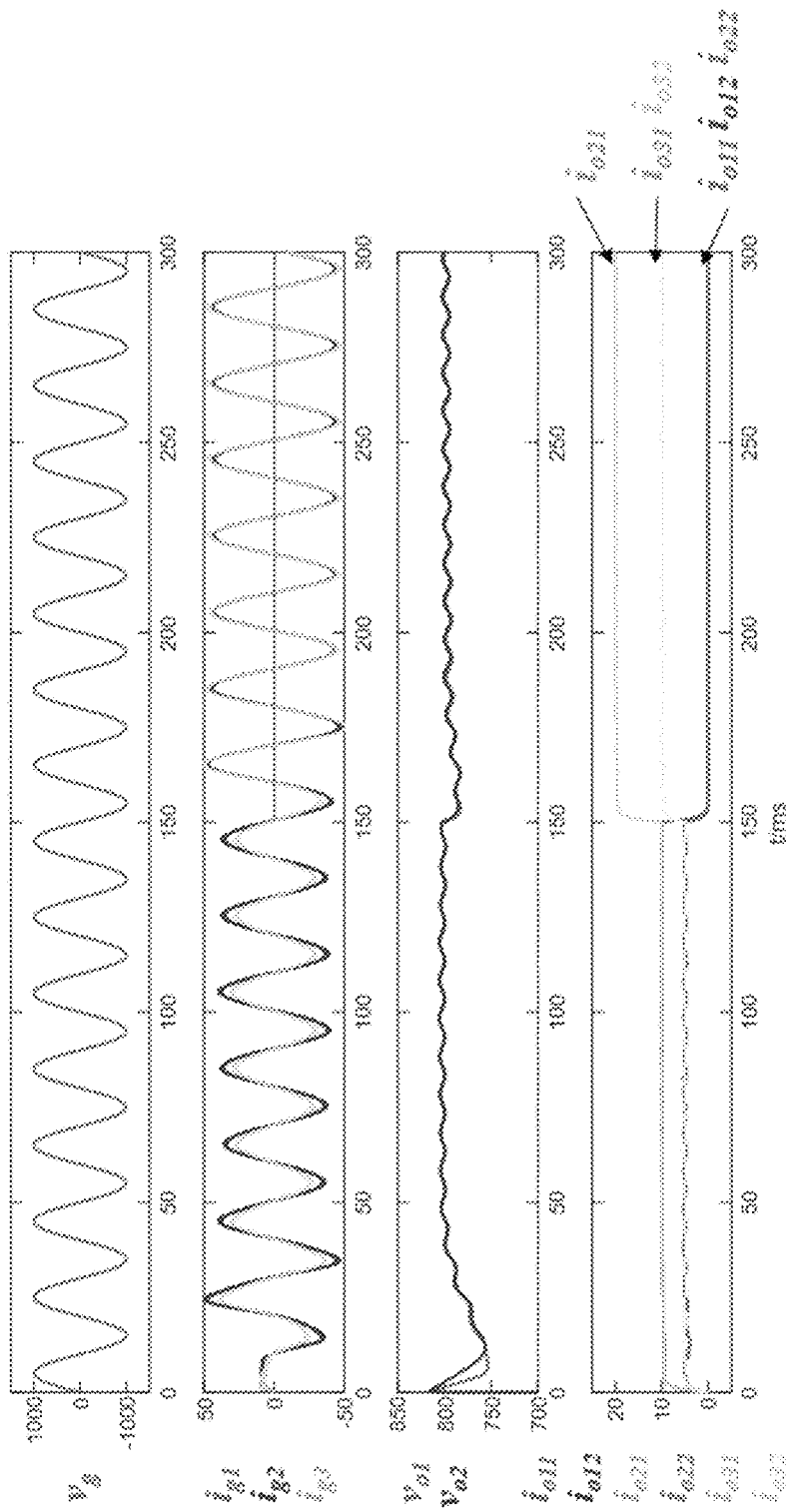
FIG. 10 is a schematic diagram of fault tolerant control effect of the SST1 in the power supply system of FIG. 8.

FIG. 10 is a schematic diagram of fault tolerant control effect of SST1 in the power supply system of FIG. 8, and shows fault tolerant control effect of the SST1. When t=150 ms, the SST1 in the power supply structure A has fault and stops operation, the power distribution ratio of the SST2 and SST3 is equal to 1:1. As can be seen from FIG. 10, when the power supply structure A has SST fault, the system still can operate using the power distribution method of the disclosure.

Figure 11:
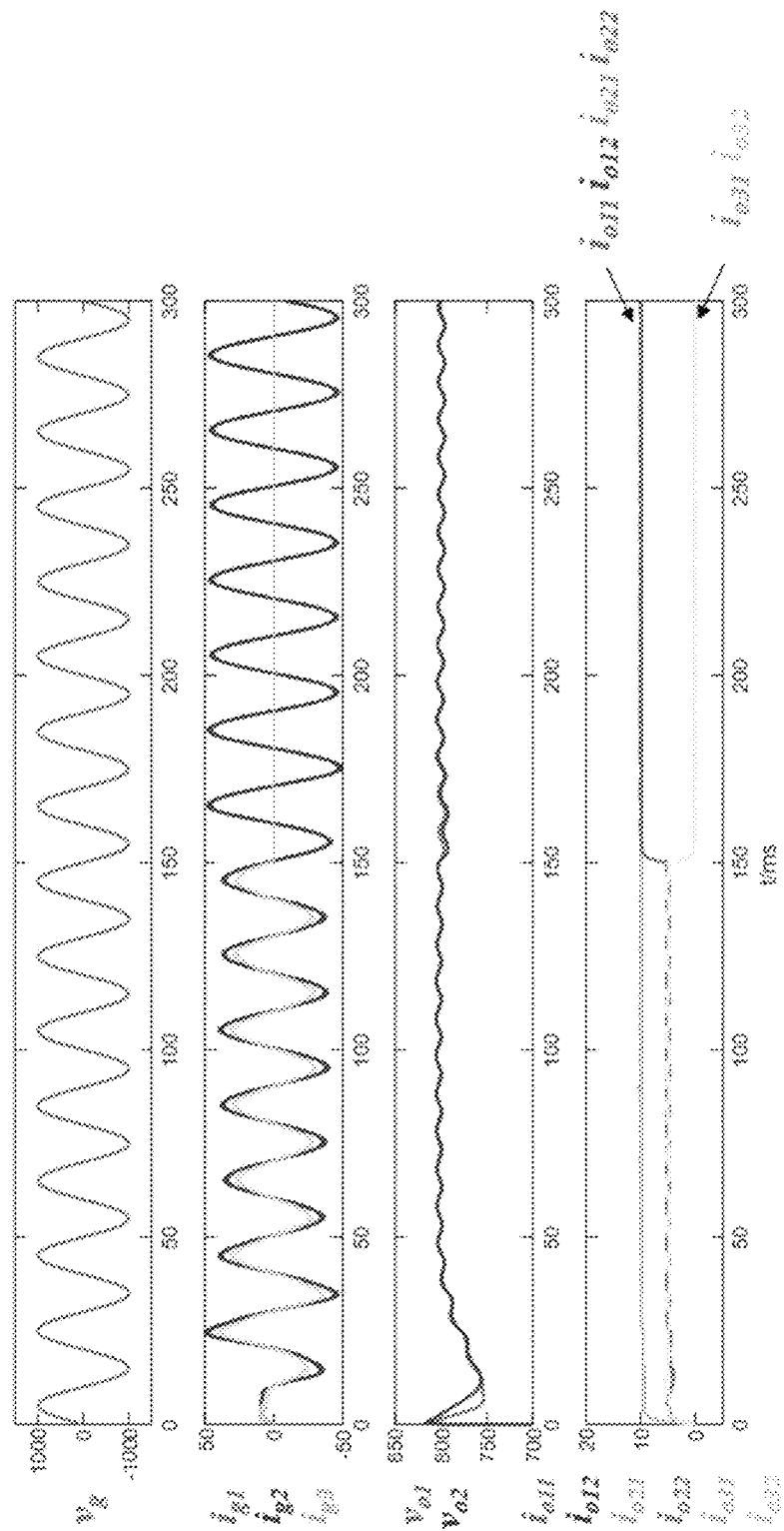
FIG. 11 is a schematic diagram of fault tolerant control effect of the SST3 in the power supply system of FIG. 8.

FIG. 11 is a schematic diagram of fault tolerant control effect of SST3 in the power supply system of FIG. 8, and shows fault tolerant control effect of the SST3. When t=150 ms, the SST3 in the power supply structure B has fault and stops operation, the power distribution ratio of the SST1 and SST2 in the power supply structure A is equal to 1:1. As can be seen from FIG. 11, when the power supply structure B has SST fault, the system still can operate using the power distribution method of the disclosure.

The disclosure further provides a power supply method, and the power supply method may power using the power supply system of the disclosure.

In the disclosure, particularly, when the wire acts as the connection unit, power through the wire can be controlled through power distribution. When the fuse acts as the connection unit, the fuse can be disconnected by the way of increasing the current, and can be reconnected by the way of exchanging the fuse.

The disclosure connects at least two power supply structures having different power supply availabilities through the connection unit, and may achieve the power supply structure having new power supply availability. Moreover, the power supply system of the disclosure may supply several power supply availabilities, and may be applied to application scenarios where data center computer room shall supply several power supply availabilities to the loads, so the system is simple in structure and has low investment cost, and it also may be applied to reconstruct or enhance circuits having a low power supply availability.

Technical advantage of the power supply system and the power supply method of the disclosure is to supply more power supply availabilities through few types of power supply structures, which facilitates the data center to flexibly adjust the power supply structures according to business, and save cost.

Exemplary embodiments of the disclosure have been specifically shown and described above. It should be understood that the disclosure is not limited to the disclosed embodiments. Instead, the disclosure intends to cover various modifications and equivalent arrangements included in the spirit and scope of the appended claims.

What is claimed is:

1. A power supply system, comprising:
a first sub-system comprising at least two first power supply devices and a first load, the first power supply devices for powering the first load;
a second sub-system comprising a second power supply device and a second load, the second power supply device for powering the second load; and
a connection unit configured to control electrical connection or electrical disconnection between the first power supply devices and the second load;
wherein when the connection unit is electrically disconnected, the first sub-system comprises a second power supply availability, the second sub-system comprises a first power supply availability;

when the connection unit is electrically connected, the first sub-system and the second sub-system comprise a third power supply availability;

the third power supply availability is higher than the first power supply availability and lower than the second power supply availability.

2. The power supply system according to claim 1, wherein,
the first sub-system further comprises at least two first energy storage devices, wherein the first energy storage devices electrically connected to the first power supply devices in one-to-one correspondence; and
the second sub-system further comprises a second energy storage device electrically connected to the second power supply device.

3. The power supply system according to claim 1, wherein,
the first sub-system is a 2N power supply structure, a DR power supply structure or a RR power supply structure; and
the second sub-system is a N power supply structure, a DR power supply structure or a RR power supply structure.

4. The power supply system according to claim 3, wherein,
the first sub-system is the 2N power supply structure, and comprises two first power supply devices and one first load, the two first power supply devices for powering a first port and a second port of the first load; and
the second sub-system is the N power supply structure, and comprises one second power supply device and one second load, the second power supply device for powering a first port of the second load;
wherein each of the first power supply devices powers a second port of the second load through the connection unit.

5. The power supply system according to claim 4, wherein,
the first power supply devices comprise a first bus and a second bus independent from each other, and the first power supply devices power the first port and the second port of the first load through the first bus, and power the second port of the second load through the second bus and the connection unit.

6. The power supply system according to claim 1, wherein,
the first power supply devices comprise a first AC-DC converter and a plurality of first DC-DC converters connected to the first AC-DC converter.

7. The power supply system according to claim 6, wherein the first AC-DC converter is a three-level HPFC circuit, and the first DC-DC converters are LLC converters.

8. The power supply system according to claim 1, wherein,
the second power supply device comprises a second AC-DC converter and a plurality of second DC-DC converters connected to the second AC-DC converter.

9. The power supply system according to claim 8, wherein the second AC-DC converter is a three-level HPFC circuit, and the second DC-DC converters are LLC converters.

10. The power supply system according to claim 1, wherein,
the number of the first sub-system is one, the number of the second sub-system is equal to that of the connection unit and is at least two, and each of the second sub-systems is electrically connected to the first sub-system through the corresponding connection unit.

11. The power supply system according to claim 1, wherein the connection unit is a wire, a fuse, a switch or a converter.

12. The power supply system according to claim 1, wherein,
when the connection unit is electrically disconnected, the first sub-system and the second sub-system are in an independent operating state, and power distribution of the first sub-system and the second sub-system is independently controlled; and
when the connection unit is electrically connected, the first sub-system and the second sub-system are in an interconnected operating state, and power distribution of the first sub-system and the second sub-system is in associated control.

13. The power supply system according to claim 12, wherein,
the first power supply device and the second power supply device both comprise a power distribution unit, and when the connection unit is electrically disconnected, the power distribution unit is configured to control power distribution inside the first sub-system or the second sub-system; when the connection unit is electrically connected, the power distribution unit is configured to control power distribution between the first sub-system and the second sub-system.

14. The power supply system according to claim 13, wherein,
the power distribution unit comprises a voltage-current droop control module for regulating power, and satisfying:

$$v_{oref} = v_{oset} - k * i_o,$$

where $v_{oset}$ is a set value of an output voltage, $v_{oref}$ is a reference voltage of a voltage and current loop, $i_o$ is an output current, and k is a current divider coefficient.

15. The power supply system according to claim 14, wherein,
the power distribution unit further comprises an output voltage coordination integral module for eliminating a static error of the output voltage $v_o$, and satisfying:

$$Inti = \int [a1 * (v_{oset} - v_o) + a2 * (Intmean - Inti)],$$

where Inti is an integral value of the corresponding power supply device, Intmean is an integral mean of the power supply device of the power supply system, a1 and a2 are regulation coefficients, and it satisfies:

$$v_{oref} = v_{oset} - k * i_o + Inti.$$

16. The power supply system according to claim 13, wherein,
the first sub-system is a 2N power supply structure, and comprises two first power supply devices; and
the second sub-system is a N power supply structure, and comprises one second power supply device;

wherein the power supply system supplies the first power supply availability corresponding to the N power supply structure and the second power supply availability corresponding to the 2N power supply structure through electrical disconnection of the connection unit, and supplies the third power supply availability corresponding to a DR power supply structure through electrical connection of the connection unit, and the third power supply availability is higher than the first power supply availability and lower than the second power supply availability.

17. The power supply system according to claim 16, wherein the first load and the second load have equal power.

18. The power supply system according to claim 17, wherein,
when the connection unit is electrically disconnected, the two first power supply devices distribute power by 1:1;
when the connection unit is electrically connected, the two first power supply devices and the second power supply device distribute power by 3:3:2.

19. The power supply system according to claim 17, wherein,
when one of the two first power supply devices has fault and stops operation, if the connection unit is configured to be electrically connected, the other of the two first power supply devices and the second power supply device distribute power by 1:1;
when the second power supply device has fault and stops operation, the two first power supply devices distribute power by 1:1;
when the one first power supply device and the second power supply device have fault and stop operation, the connection unit is configured to be electrically disconnected, and the first load powers through the other first power supply device.

20. A power supply method, comprising:
providing a first sub-system, the first sub-system comprising at least two first power supply devices and a first load, supplying power to the first load through the at least two first power supply devices;
providing a second sub-system, the second sub-system comprising a second power supply device and a second load, supplying power to the second load through the second power supply device;
providing a connection unit, controlling electrical connection or electrical disconnection between the at least two first power supply devices and the second load through the connection unit;
wherein when the connection unit is electrically disconnected, the first sub-system comprises a second power supply availability, the second sub-system comprises a first power supply availability;
when the connection unit is electrically connected, the first sub-system and the second sub-system comprise a third power supply availability;
the third power supply availability is higher than the first power supply availability and lower than the second power supply availability.

\* \* \* \* \*